United States Patent [19]

Otto

[11] 4,350,506

[45] Sep. 21, 1982

[54] WASHING DEVICE

[75] Inventor: Eberhard Otto, Möglingen, Fed. Rep. of Germany

[73] Assignee: Otto Dürr Anlagenbau GmbH, Stuttgart, Fed. Rep. of Germany

[21] Appl. No.: 231,680

[22] Filed: Feb. 5, 1981

[30] Foreign Application Priority Data

Nov. 11, 1980 [DE] Fed. Rep. of Germany ....... 3042464

[51] Int. Cl.³ .................. B01D 47/10; F23J 11/00
[52] U.S. Cl. ......................................... 55/241; 55/276; 55/DIG. 46; 261/62; 261/112; 261/DIG. 54; 98/115 SB; 118/DIG. 7
[58] Field of Search ......... 55/240, 241, 276, DIG. 46; 261/62, 109, 112, DIG. 54; 118/326, DIG. 7; 98/115 SB

[56] References Cited

U.S. PATENT DOCUMENTS

| | | | |
|---|---|---|---|
| 3,112,352 | 11/1963 | Krantz | 261/112 |
| 3,131,237 | 4/1964 | Collins, Jr. | 261/112 |
| 3,138,087 | 6/1964 | Larsson et al. | 261/112 |
| 3,138,647 | 6/1964 | Krantz | 261/112 |
| 3,795,093 | 3/1974 | Gebhard et al. | 55/240 |
| 3,934,495 | 1/1976 | Bloomer | 261/112 |
| 4,045,524 | 8/1977 | Bornert | 55/240 |
| 4,131,439 | 12/1978 | Hölter | 201/DIG. 54 |
| 4,220,078 | 9/1980 | Walker et al. | 55/240 |
| 4,257,784 | 3/1981 | Gebhard et al. | 55/241 |

FOREIGN PATENT DOCUMENTS

| | | | |
|---|---|---|---|
| 2039778 | 8/1980 | United Kingdom | 55/276 |
| 415022 | 6/1974 | U.S.S.R. | 261/112 |

Primary Examiner—David L. Lacey
Attorney, Agent, or Firm—Michael J. Striker

[57] ABSTRACT

A washing device comprises an upper chamber containing a washing liquid and communicating with an enamel-spraying device and a lower under-pressure chamber. A nozzle is installed between those two chambers which has an inlet to receive the washing liquid and a gaseous mixture to be washed and an outlet communicating with the under-pressure chamber. The particle-containing gaseous mixture is drawn through the washing liquid atomized in the nozzle and is washed thereby. The nozzle has a cross-section of a bell-like configuration and is provided with edges at the outlet of the nozzle. These edges face toward the central axis of the casing and are provided with teeth whereby the surface of contact of the particles with the atomized washing liquid at the outlet of the nozzle is substantially increased and the distribution of the washing liquid at the outlet of the nozzle is improved.

25 Claims, 10 Drawing Figures

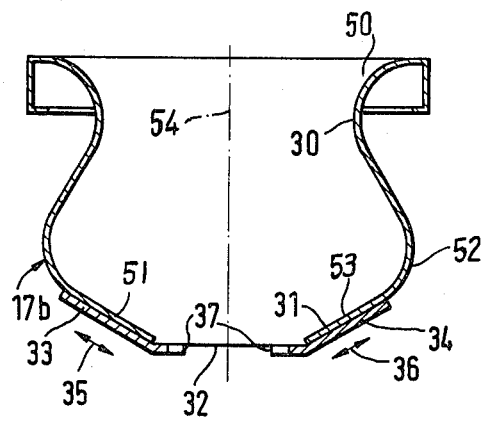
FIG. 1
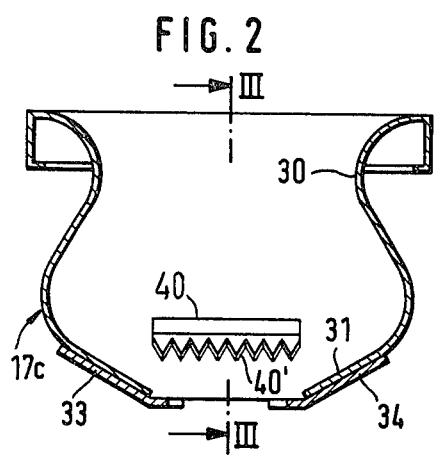
FIG. 2
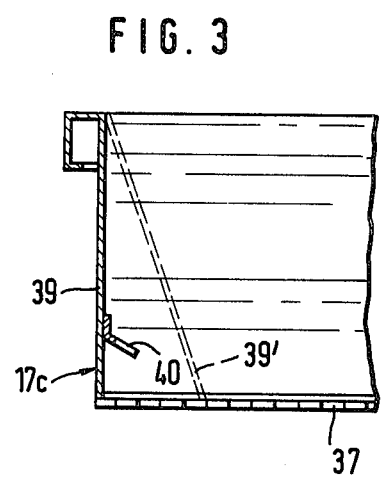
FIG. 3
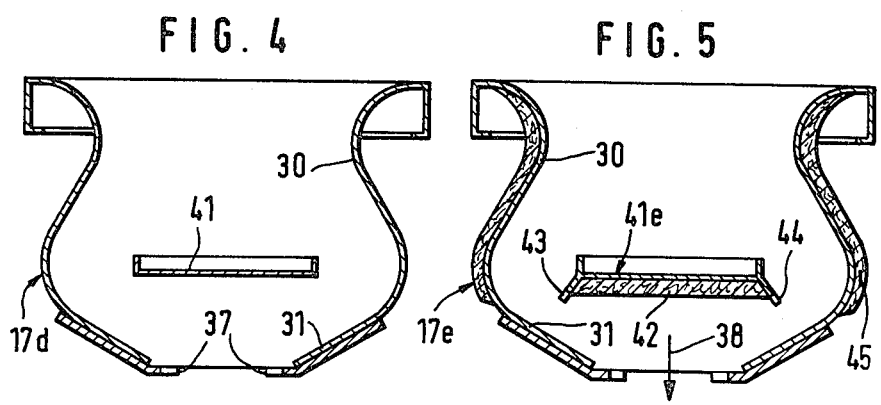
FIG. 4
FIG. 5

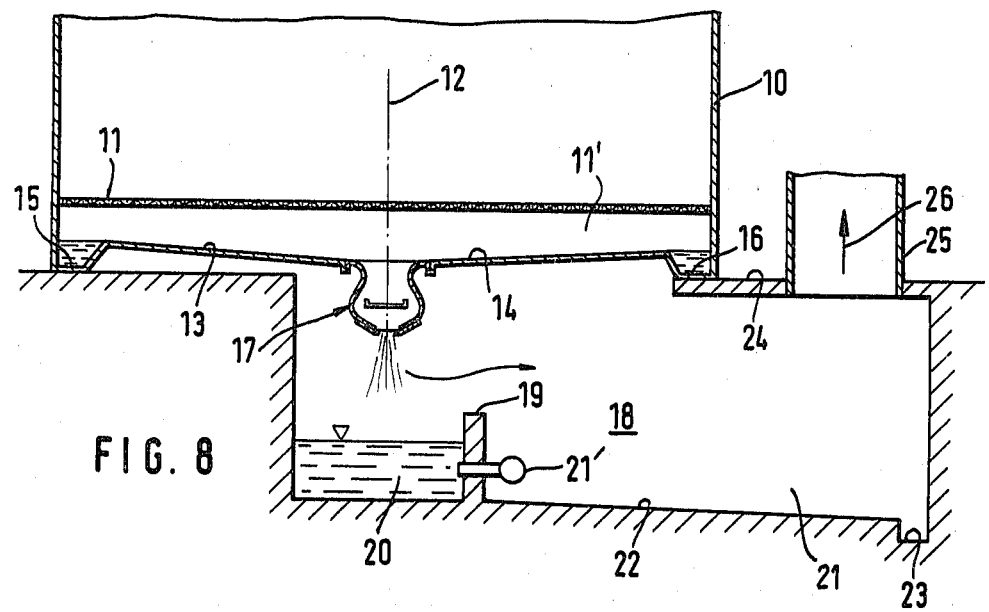
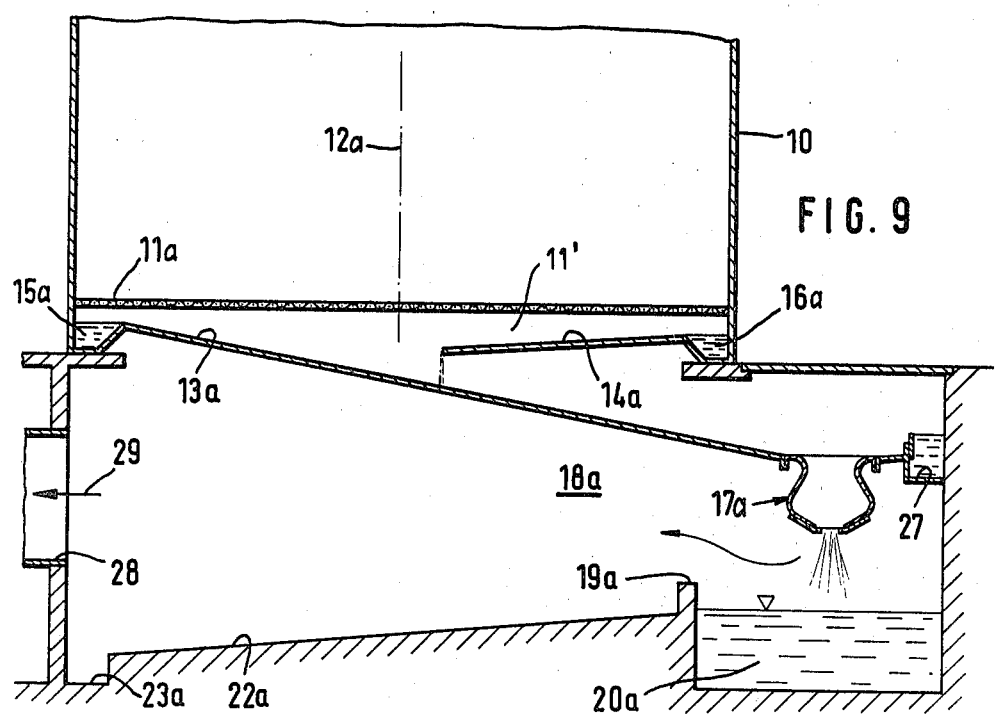

WASHING DEVICE

BACKGROUND OF THE INVENTION

The invention pertains to washing devices utilized for washing solid and liquid particles out of gases, for example exhaust gases from enamel or paint-spraying installations used for painting vehicle bodies or other items.

The exhaust gas or air is normally washed by means of a nozzle having an inlet to receive a mixture of particle-containing gases and a washing liquid which is atomized in the nozzle, and an outlet through which the mixture is drawn and washed by the atomized washing liquid.

Washing devices of this type may be utilized for segregating, washing, wetting and cleaning exhaust air from enamel-spraying chambers, abrasion machines and evaporizers. The washing devices generally used in the industry are adapted to wash out adhesive particles, dust or any contaminating particles contained in exhaust air.

In the conventional devices exhaust air containing fine particles such as enamel particles is fed through a stream of atomized washing liquid. In such mode of washing the particles such as lacquer particles are adhered to the droplets of the washing liquid whereby a reduction of tackiness and coagulation of the particles, e.g. lacquer particles is initiated.

The separation of air from the washing liquid and particles taken place in an under pressure chamber installed below the enamel-spraying chamber. The known washing devices are often utilized for cleaning exhaust air in spraying chambers for painting vehicle bodies. Such washing devices are disclosed, for example in German Pat. Nos. 1,427,597; 2,800,668; and 1,266,188.

The known constructions of washing devices are, however, disadvantageous in that a high energy consumption is required to obtain a satisfactory degree of removal of lacquer particles.

SUMMARY OF THE INVENTION

It is therefore an object of the invention to provide an improved washing device.

Another object of the invention is to provide an effective washing device with substantially reduced energy consumption.

Still another object of the invention is to provide a washing device where the atomization of the washing liquid during the washing process is substantially improved.

These and other objects of the invention are attained by a washing device for washing solid and liquid particles out of gases, particularly out of exhaust air from enamel-spraying chambers, comprising a housing adapted to be positioned below the spraying chamber and including a first washing fluid-containing chamber, a second under-pressure chamber, and a nozzle means positioned between said washing-fluid containing chamber and said under-pressure chamber, said nozzle means including a casing having an inlet associated with said first chamber and adapted to receive and atomize the washing liquid and a gaseous mixture to be washed and an outlet associated with said second chamber so that said particle-containing gaseous mixture is drawn through the atomized washing liquid at said outlet, said casing having a cross-section of a substantially bell-like shape to provide for optimum distribution of the atomized washing liquid.

The casing may have a central axis and be bounded by two opposite faces. The casing may further include an uppermost portion widening relative to said central axis and defining said inlet, an intermediate portion narrowing relative to said central axis, a lower portion widening relative to said central axis and a lowermost portion narrowing with respect to said central axis and defining said outlet, said uppermost portion merging into said intermediate portion, said intermediate portion merging into said lower portion, and said lower portion merging into said lowermost portion, said portions in cross-section defining said bell-like shape.

By provision of the shape of the nozzle means with a bell-like shape the loss of kinetic energy within the casing of the nozzle is substantially reduced, since the gas-liquid mixture flowing through the nozzle does not undergo any appreciable deflection in its flow direction. Accordingly, almost the entire kinetic energy of the mixture can be used in the under-pressure chamber to effect the separation of lacquer particles and water from the mixture stream.

The lowermost portion of the casing may be terminated with one or more edges facing toward said central axis and defining said outlet, said edges being provided with teeth or serrations directed toward said central axis.

The teeth may alternatively have a triangular, rectangular or wave-like shape.

Said edges may extend substantially transversely of the flow of said mixture drawn at said outlet. Said edges may also extend in a direction substantially opposite to the flow of said mixture sucked at said outlet.

The device may further include a pair of elements connected respectively to said lowermost portion and provided with said edges, said elements being adjustable relative to said central axis so that said edges may be shifted away from or towards said axis, whereby the size of said outlet may be varied.

The device may further include at least one angularly-shaped member connected to one of said faces in the vicinity of said lowermost portion and provided with teeth facing towards said outlet to further optimize the distribution of the mixture discharged from said nozzle means. The teeth of said angularly-shaped member may have a triangular, or wave-like shape.

By provision of teeth on the edges of the nozzle means at the outlet thereof the edge face of the outlet contacting the mixture and liquid discharged therefrom is increased 100% or even more. This results in substantial improving of the atomization and even agitation of the washing liquid as compared to the conventional devices operating under the same loads. In turn, this increases the probability that the wash liquid will contact and entrain even the smallest particles contained in the air or gas stream. This substantially improves the quality of the washing devices due to the respective reduction of particles in exhaust gases or air and therefore reduction of pollution in the atmosphere.

The opposite faces bounding the nozzle casing may extend perpendicularly to said edges facing towards said central axis. At least one of said faces may be inclined relatively to said edges. The angle of the inclination of said one face may be about 30°.

The lowermost portion of the casing may extend at an angle of about 60° to said central axis.

The device may further include sound-absorbing means on said casing.

The sound-absorbing means may include a cup-shaped element filled with said washing liquid and mounted within said casing.

Said cup-shaped element may be provided with two laterally outwardly extending portions which are formed with teeth. These teeth may be triangular or wave-shaped.

The sound-absorbing means may further include a layer of a noise-damping material coating the exterior of said casing.

A layer of a noise-damping material may be inserted on said cup-shaped element between said two laterally extending portions.

The under pressure chamber may be positioned in the housing immediately below said washing-liquid-containing chamber of laterally displaced relative thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a vertical sectional view of a nozzle of a washing arrangement according to a first embodiment of the invention;

FIG. 2 shows a vertical sectional view of the nozzle of a second embodiment of the invention;

FIG. 3 is a partial sectional view taken along line III—III of FIG. 2;

FIG. 4 illustrates a vertical sectional view of the nozzle in accordance with still another embodiment of the invention;

FIG. 5 is a vertical sectional view of yet another embodiment of the nozzle;

FIG. 8 is a partial vertical sectional view of a washing arrangement; and

FIG. 9 is a partial vertical sectional view of the modified washing arrangement.

DETAILED DESCRIPTION OF THE PREFERRED EMBODIMENTS

Figure 6:
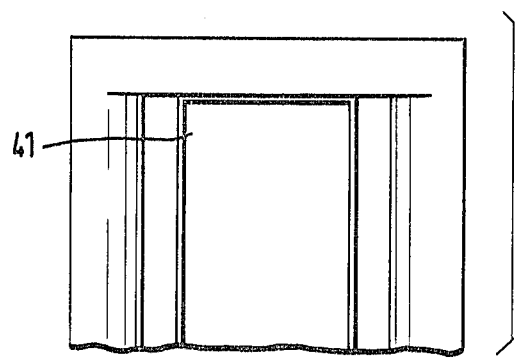
FIGS. 6 and 6A are partial plan views of the nozzle illustrating different embodiments of the invention.

Referring to the drawings, FIG. 8 illustrates a a device for washing exhaust air comprising solid and liquid particles removed from paint or enamel-spraying chambers. The reference numeral 10 designates a spraying chamber in which a workpiece to be coated, such as a car body, not illustrated herein, is located. The spraying chamber 10 includes a grid 11 through which a mixture of exhaust air with solid and liquid particles entrained therein, passes. A pair of slightly inclined sheet-metal plates 13 and 14 are positioned below the grid 11 to form a bottom tub 11' having a central axis 12. The plates 13 and 14 are sloped towards the axis 12 and are formed with lateral channels 15 and 16 which are filled with washing water. A nozzle 17 positioned midway of plates 13 and 14 is installed in the washing arrangement. Water contained in the tub 11' is discharged through the nozzle 17 into a low pressure chamber or zone denoted as 18.

The nozzle 17 may have various forms which are depicted in FIGS. 1–7 and will be described in detail below.

The underpressure or low pressure chamber 18 is subdivided into two compartments by a partition 19. One of the compartments 20 is a reservoir for collecting the overflow water from channels 15, 16 and enamel or varnish transmitted by the nozzle 17. The second compartment 21 contains air separated from water and enamel particles during the washing process. A bottom wall 22 of the chamber 18 positioned laterally of the compartment 20 is slightly inclined and terminated with a chamber outlet 23 of a channel-shaped form through which excess water is drained off from the chamber. Water from compartment 20 is recirculated to the channels 15, 16 via a pipe 21'.

The chamber 18 is provided with an upper cover 24 offset relative to the spraying chamber 10. A nipple or conduit 25 is mounted in the cover 24 to discharge the purified air from the chamber 18. The purified air may be drawn from the chamber 18 by means of a non-illustrated fan in the direction of arrow 26.

FIG. 9 shows another embodiment of the washing device in which the reference numerals denoting the elements common to those depicted in FIG. 8 have an additional index a.

The modification of the washing device shown in FIG. 9 also includes a grid 11a and a tub 11' formed with two laterally disposed channels 15a and 16a filled with washing water. In this embodiment the nozzle 17a is laterally offset with reference to the enamel-spraying or painting chamber 10. The asymmetrical disposition of the nozzle 17a is to reduce noise in order to protect a worker in chamber 10 against excessive noise. The asymmetrical position of the nozzle 17a results in asymmetrical location of the plates 13a and 14a forming the tub 11'. An additional overflow channel 27 is formed in the tub 11' which is also filled with washing water.

The purified exhaust air is directed outside the chamber 18a in direction of the arrow 29 through a conduit 28 extended laterally of the chamber 18a. In both of the embodiments illustrated in FIGS. 8 and 9 various modifications of nozzle 17 and 17a may be employed.

Such modifications are depicted in FIGS. 1–7 of the drawings. Referring now to FIG. 1, it may be seen that the nozzle 17b is generally bell-shaped in cross-section. As clearly seen in FIGS. 3 and 6, the nozzle of each of the embodiments described herein has a substantially rectangular shape as viewed from above. The housing of the nozzle is bounded by front and rear wall 39 (only one front wall 39 is shown in FIG. 3) and includes an uppermost widening portion 50 which merges into a narrowing intermediate portion 30 which in turn merges into lower bulged widening portion which terminates with a lowermost narrowing portion 31. The uppermost widening portion 50 represents the nozzle inlet whereas the lowermost narrowing portion 31 is terminated with a nozzle outlet aperture 32. The indexes b–e are used in the foregoing description to designate similar elements of the nozzle shown in the various embodiments of the invention. The nozzle aperture 32 is of substantially rectangular shape and is centered on a central axis 54 of the nozzle housing.

The narrowing portion 31 includes the walls 51 and 53 which may be inclined towards the central axis 54 at an angle of about 60°.

The lowermost narrowing portion 31 is partially covered from outside with two laterally and angularly projecting elements 33 and 34 which partially engage the outer surface of the portion 31 and extend toward the central axis 54 so that they may partially close the nozzle aperture 32. The elements 33 and 34 are adjustable in the directions denoted by arrows 35 and 36 to vary the size of the nozzle aperture.

Figure 7:
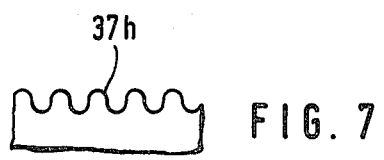
FIG. 7 shows a partial view of the shape of teeth in accordance with one of the embodiments which are provided on an outlet portion of the nozzle.

The elements 33 and 34 have respective edges 37 facing towards the central axis 54. These edges may be tooth-shaped or wave-shaped as seen in FIGS. 6 and 7. The tooth-shaped or wave-shaped edges may be directed towards and transversely of the flow direction of the air-water-enamel particle mixture which is shown by arrow 38 (FIG. 5). Alternatively, the edges 37 may be angularly directed towards the direction of the flow discharged from the nozzle. In both cases a fine distribution of mixture discharged between the tooth-shaped edges of the nozzle aperture may be obtained whereby the optimum seizing of the particles contained in the mixture discharged from the spraying chamber by washing liquid flowing through the nozzle is warranted.

Figure 6A:
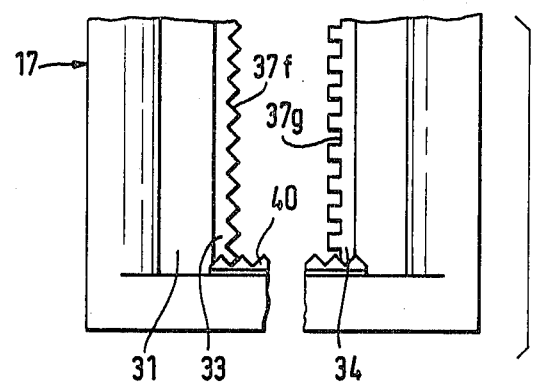

FIGS. 6, 6A and 7 show three various modifications of the structure of edges 37. The reference numeral 37F denotes the modification in which the edges are formed with triangular teeth or are saw-tooth-shaped. The reference numeral 37G in FIG. 6A designates the edge of the element 34 having teeth of a rectangular shape. FIG. 7 illustrates wave-shaped teeth.

In the embodiment shown in FIGS. 2 and 3, the nozzle is provided with angularly-shaped elements 40 which may be attached to the front wall 39 and the non-illustrated rear wall, respectively. The lower angularly-extending portion of the element 40 is provided with teeth 40' of triangular or wave-like shape which are adapted to further optimize the distribution of the mixture discharged from the nozzle 17. The front wall of the nozzle may be sloped as shown by double dashed line 39' in FIG. 3.

FIG. 4 shows the nozzle provided with a sound-absorbing covering element 41 positioned in the interior of the nozzle housing. The cover 41 has a cup-shaped chamber filled with washing water to reduce the undesirable upward radiation of noise in direction towards the spraying chamber 10.

FIG. 5 illustrates a nozzle structure in which the noise-absorbing cover 41e is covered at the bottom outer surface with a layer 42 of an antinoise-compound-containing material. The cover 41e may be additionally provided with two laterally outwardly extending sections 43 and 44 which also may be formed with teeth. The outer periphery of the nozzle 37 may also be covered with a layer 45 of antinoise-compound-containing material. The purpose of such arrangement is to further reduce the level of undesirable noise in the washing device.

It will be understood that each of the elements described above, or two or more together, may also find a useful application in other types of washing device differing from the types described above.

While the invention has been illustrated and described as embodied in a washing devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A washing device for washing solid and/or liquid particles out of gases, particularly out of exhaust air from enamel-spraying chambers, comprising a housing adapted to be positioned below the spraying chamber; partition means in said housing dividing the housing into a first chamber filled with washing fluid and a second underpressure chamber; and nozzle means arranged in said partition means between said first chamber and said second chamber, said nozzle means including a casing having an inlet communicating with said first chamber and positioned to receive and atomize the washing fluid and also to receive a gaseous mixture to be washed, and an outlet communicating with said second chamber so that a flow of the particle-containing gaseous mixture is drawn through the atomized washing fluid and through said outlet, said casing having an axis of symmetry and being bounded by two opposite faces and including an uppermost portion widening relative to said axis of symmetry and defining said inlet, an intermediate portion narrowing relative to said axis, a lower portion widening relative to said axis, and a lowermost portion narrowing with respect to said axis and defining said outlet, said uppermost portion merging directly into said intermediate portion, said intermediate portion merging into said lower portion, and lower portion merging into said lowermost portion so that said portions define a cross-section of said casing having a bell-like configuration to thereby provide for optimum distribution of the atomized washing fluid.

2. The device of claim 1, wherein said lowermost portion is terminated with edges facing toward said axis of symmetry and defining said outlet, said edges being provided with teeth directed toward said axis of symmetry.

3. The device of claim 2, wherein said teeth have a triangular shape.

4. The device of claim 2, wherein said teeth have a rectangular shape.

5. The device of claim 2, wherein said teeth have a wave-like shape.

6. The device of claim 2, wherein said edges extend substantially transversely to said axis of symmetry.

7. The device of claim 2, wherein said edges extend in a direction substantially opposite to said axis of symmetry.

8. The device of claim 2, further including a pair of elements connected respectively to said lowermost portion and provided with said edges, said elements being adjustable relative to said axis of symmetry so that said edges may be shifted away from or towards said axis, whereby the size of said outlet may be varied.

9. The device of claim 8, further including at least one angularly-shaped member connected to one of said faces in the vicinity of said lowermost portion and provided with teeth facing towards said outlet to further optimize the distribution of the mixture discharged from said nozzle means.

10. The device of claim 9, wherein the teeth of said angularly-shaped member have a triangular shape.

11. The device of claim 9, wherein the teeth of said angularly-shaped member have a wave-like shape.

12. The device of claim 8, wherein said faces extend perpendicularly to said edges facing toward said axis of symmetry.

13. The device of claim 8, wherein at least one of said faces is inclined relatively to said edges.

14. The device of claim 13, wherein the angle of inclination of said at least one face is about 30°.

15. The device of claim 8, wherein said lowermost portion is formed by walls extending at an angle of about 60° to said axis of symmetry.

16. The device of claim 8, further including sound-absorbing means on said casing.

17. The device of claim 16, wherein said sound-absorbing means include a cup-shaped element filled with said washing fluid and mounted within said casing.

18. The device of claim 17, wherein said cup-shaped element is provided with two laterally outwardly extending portions which are formed with teeth.

19. The device of claim 18, wherein the teeth of said laterally extending portions are triangular-shaped.

20. The device of claim 18, wherein the teeth of said laterally extending portions are wave-shaped.

21. The device of claim 18, wherein said sound-absorbing means include a layer of a noise-compound-containing material coating the exterior of said casing.

22. The device of claim 18, wherein said sound-absorbing means include a layer of a noise-compound-containing material inserted on said cup-shaped element between said two laterally extending portions.

23. The device of claim 1, wherein said second under-pressure chamber is positioned in said housing immediately below said first chamber.

24. The device of claim 1, wherein said second chamber is positioned below said first chamber but laterally displaced relative thereto.

25. The device of claim 1, wherein said first chamber and said second chamber are made of the same material.

* * * * *